US009100458B2

(12) United States Patent  
Mehta et al.

(10) Patent No.: US 9,100,458 B2  
(45) Date of Patent: Aug. 4, 2015

(54) APPARATUS AND METHOD FOR DELIVERING MEDIA CONTENT

(75) Inventors: Neerav Mehta, Middletown, NJ (US); Paritosh Bajpay, Edison, NJ (US); Michele Macauda, Monroe, CT (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1048 days.

(21) Appl. No.: 12/208,853

(22) Filed: Sep. 11, 2008

(65) Prior Publication Data

US 2010/0063989 A1 Mar. 11, 2010

(51) Int. Cl.
| | |
|---|---|
| *G06F 15/16* | (2006.01) |
| *H04L 29/06* | (2006.01) |
| *H04N 21/2343* | (2011.01) |
| *H04N 21/258* | (2011.01) |
| *H04N 21/414* | (2011.01) |
| *H04L 29/08* | (2006.01) |
| *H04L 12/58* | (2006.01) |
| *H04N 21/61* | (2011.01) |

(52) U.S. Cl.
CPC ........ *H04L 65/4076* (2013.01); *H04N 21/2343* (2013.01); *H04N 21/25808* (2013.01); *H04N 21/25891* (2013.01); *H04N 21/41407* (2013.01); *H04L 12/58* (2013.01); *H04L 12/581* (2013.01); *H04L 51/04* (2013.01); *H04L 67/306* (2013.01); *H04N 21/6125* (2013.01); *H04N 21/6137* (2013.01)

(58) Field of Classification Search
CPC ....... H04L 12/58; H04L 51/04; H04L 67/306; H04L 12/581; H04L 65/4076; H04N 21/2343; H04N 21/25808; H04N 21/25891; H04N 21/41407; H04N 21/6125; H04N 21/6137

USPC ......................................................... 709/223
See application file for complete search history.

(56) References Cited

U.S. PATENT DOCUMENTS

| | | | |
|---|---|---|---|
| 6,243,761 B1 * | 6/2001 | Mogul et al. ................... 709/246 |
| 6,464,140 B1 * | 10/2002 | Weigel ..................... 235/462.07 |
| 7,975,062 B2 * | 7/2011 | Krikorian et al. ............. 709/231 |
| 2001/0034769 A1 * | 10/2001 | Rast ............................... 709/206 |
| 2002/0138547 A1 * | 9/2002 | Cherry et al. .................. 709/201 |
| 2003/0172173 A1 * | 9/2003 | Fenton .......................... 709/231 |
| 2005/0033855 A1 * | 2/2005 | Moradi et al. ................. 709/231 |
| 2005/0064852 A1 * | 3/2005 | Baldursson ................ 455/414.2 |
| 2005/0091327 A1 * | 4/2005 | Koch ............................. 709/206 |
| 2005/0120050 A1 * | 6/2005 | Myka et al. ................. 707/104.1 |
| 2005/0209927 A1 * | 9/2005 | Aaltonen et al. ................. 705/26 |
| 2006/0037052 A1 * | 2/2006 | McDowell et al. ............. 725/80 |
| 2006/0184431 A1 * | 8/2006 | Rosenberg et al. ............. 705/26 |
| 2007/0027857 A1 | 2/2007 | Deng et al. |
| 2007/0112938 A1 * | 5/2007 | Belimpasakis ............... 709/219 |
| 2007/0239867 A1 * | 10/2007 | Belimpasakis et al. ........ 709/224 |
| 2007/0300232 A1 * | 12/2007 | Marriott et al. ............... 719/311 |

(Continued)

*Primary Examiner* — Krista Zele  
*Assistant Examiner* — James Forman  
(74) *Attorney, Agent, or Firm* — Guntin & Gust, PLC; Douglas Schnabel

(57) ABSTRACT

A system that incorporates teachings of the present disclosure may include, for example, a mobile communication device, having a controller to capture media content and transmit the media content to a media server with a request for distribution of the media content to one or more targeted recipients according to a user profile associated with the mobile communication device that is stored in the media server, where a format of the media content is adjusted by the media server based at least in part on the user profile. Other embodiments are disclosed.

17 Claims, 10 Drawing Sheets

(56) References Cited

U.S. PATENT DOCUMENTS

| | | | |
|---|---|---|---|
| 2008/0016185 A1* | 1/2008 | Herberger et al. | 709/219 |
| 2008/0062887 A1* | 3/2008 | Parolkar et al. | 370/252 |
| 2008/0119131 A1* | 5/2008 | Rao | 455/3.04 |
| 2008/0139112 A1* | 6/2008 | Sampath et al. | 455/3.04 |
| 2008/0155029 A1 | 6/2008 | Helbling et al. | |
| 2008/0189293 A1* | 8/2008 | Strandel et al. | 707/10 |
| 2008/0201451 A1* | 8/2008 | Yu et al. | 709/219 |

* cited by examiner

100

200

600

APPARATUS AND METHOD FOR DELIVERING MEDIA CONTENT

FIELD OF THE DISCLOSURE

The present disclosure relates generally to network communications and more specifically to an apparatus and method for delivering media content.

BACKGROUND

Sharing of multimedia content among communication devices, including wireless and mobile devices, can be done directly through transmitting the data therebetween. Use of an electronic mailbox can also be utilized so that the data is stored for later access by the recipient. U.S. Patent Publication No. 20080155029 describes a method including receiving from an originating user a broadcast message having an address designating at least in part a group of recipients, where an intended recipient may be identified based on at least a part of the address, and where an indication of the broadcast message may then be sent to the intended recipient in accordance with a sending method that is dynamically selected from a set of sending methods associated with the intended recipient based on characteristics associated with the intended recipient.

DETAILED DESCRIPTION

Figure 1:
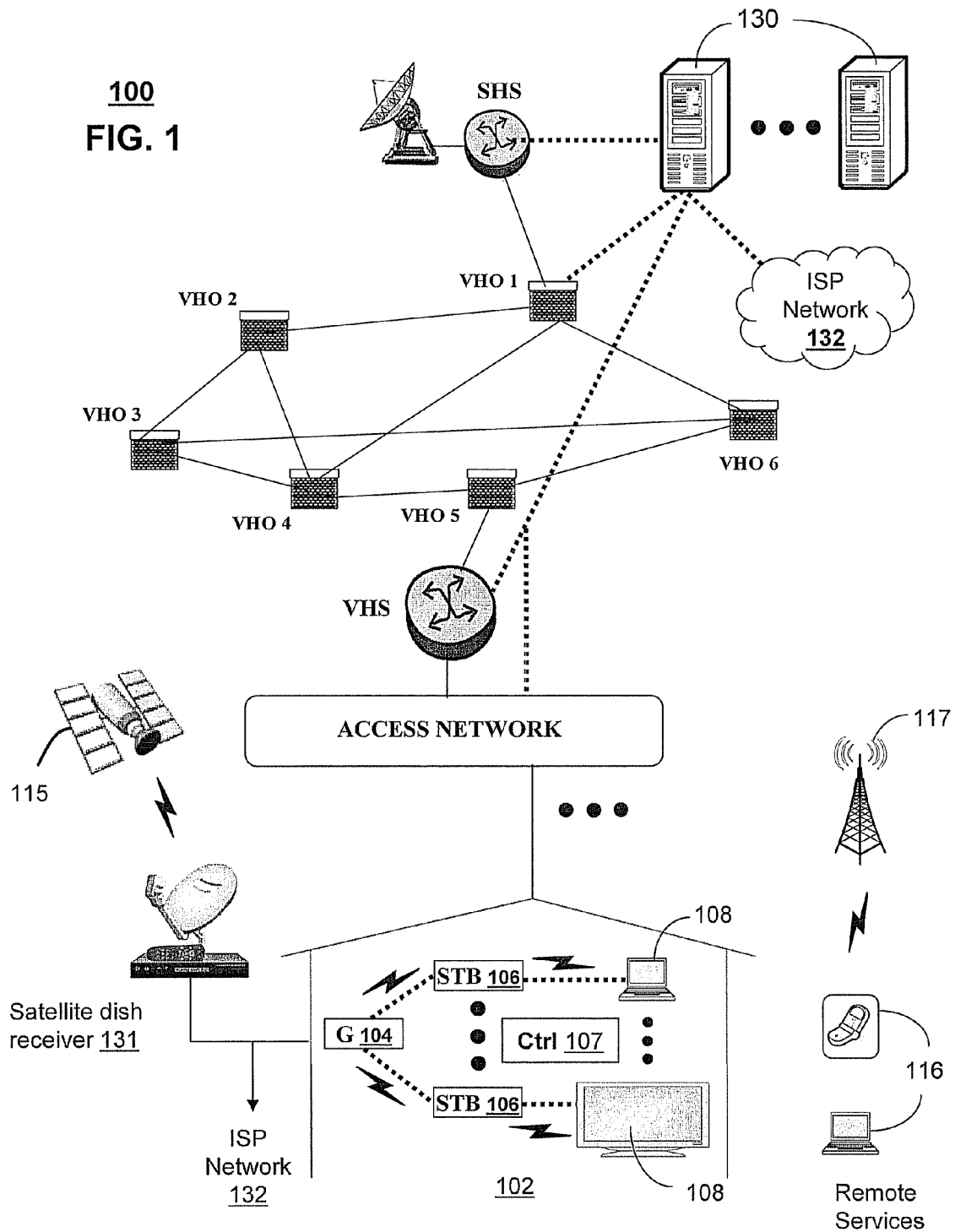
FIGS. 1-4 depict illustrative embodiments of communication systems that provide media services.

One embodiment of the present disclosure entails computer-readable storage medium, having computer instructions for receiving a request to distribute media content from a first communication device, where the media content is captured by the first communication device, determining one or more targeted recipients of the media content based on a user profile associated with the first communication device, determining a recipient format for the media content based on the user profile, where the recipient format is associated with second communication devices of the one or more targeted recipients, receiving the media content, adjusting a format of the media content according to the recipient format, and transmitting the media content with the adjusted format to the second communication devices in real time.

Another embodiment of the present disclosure entails a server having a controller to receive media content that is being captured by a first communication device, determine a desired format for the media content to be received by second communication devices of a plurality of targeted recipients based on a user profile associated with the first communication device, adjust a format of the media content based on the desired format, and transmit the media content with the adjusted format to the second communication devices.

Yet another embodiment of the present disclosure entails a server having a controller to receive media content that is being captured by a first communication device, receive a request for distribution of the media content to targeted recipients, determine second communication devices associated with the targeted recipients based on a user profile associated with the first communication device, determine a desired format for the media content to be received by the second communication devices based on the user profile, adjust a format of the media content based on the desired format, and transmit the media content with the adjusted format to the second communication devices.

Yet another embodiment of the present disclosure entails a mobile communication device having a controller to content and transmit the media content to a media server with a request for distribution of the media content to one or more targeted recipients according to a user profile associated with the mobile communication device that is stored in the media server, where a format of the media content is adjusted by the media server based at least in part on the user profile.

Yet another embodiment of the present disclosure entails a method including determining one or more targeted recipients of media content based on a user profile associated with a first communication device, determining a recipient format for the media content based on the user profile where the recipient format is associated with second communication devices of the one or more targeted recipients, receiving the media content being captured by the first communication device, adjusting a format of the media content according to the recipient format, and transmitting the media content with the adjusted format to the second communication devices of the one or more targeted recipients in real time.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network (e.g., a local area network (LAN)) to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
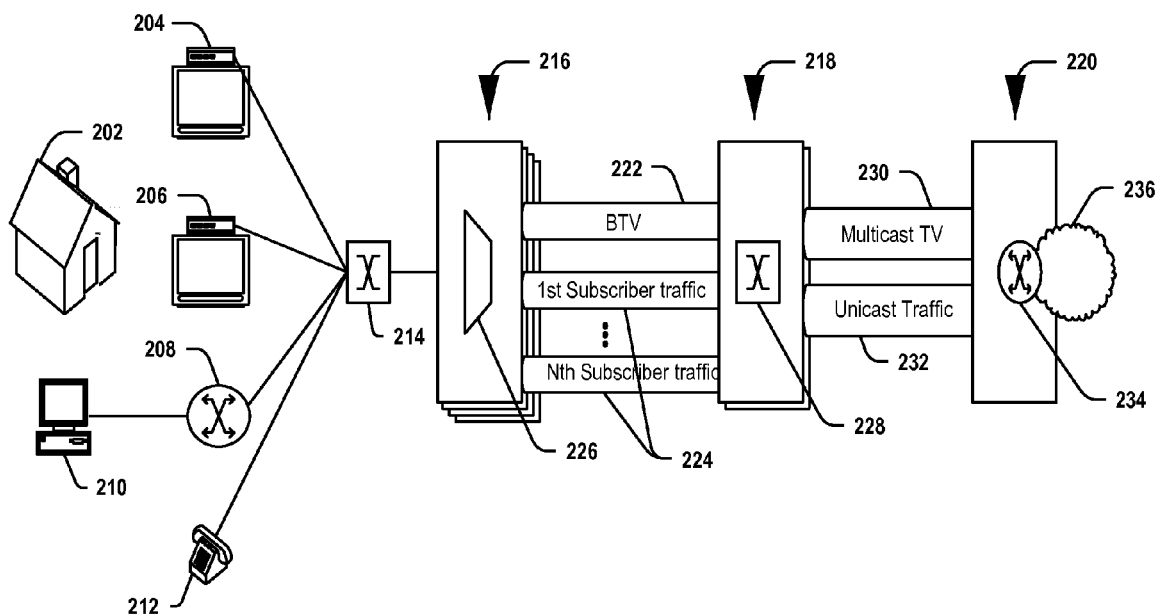

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast EP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
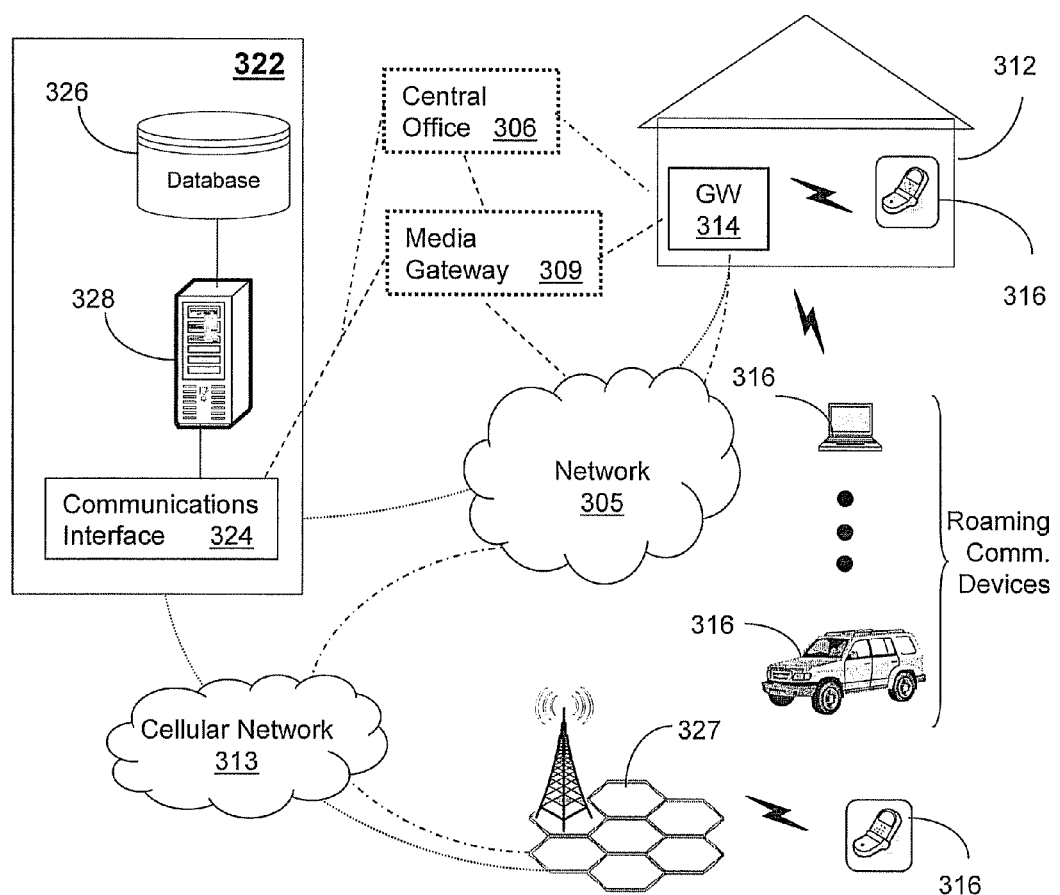

FIG. 3 depicts an exemplary embodiment of a communication system 300 employing fixed and/or mobile communication devices 316 communicating by way of wireless access points (WAPs) and/or wired infrastructure with other communication devices and/or a network proxy or web server 322, which collectively operate in the communication system 300. Communication system 300 can be overlaid or operably coupled with communication systems 100 and/or 200 as another representative embodiment of the communication system.

The communication device 316 can be a multimode communication device, such as a multimode VoIP (Voice Over Internet Protocol) terminal. However, the present disclosure also contemplates the use of other types of communication devices, including other types of voice, video and data devices. The communication system 300 can comprise a packet-switched network 305. The packet-switched network can be an ISP network 305. The network 305 can be coupled to the network proxy 322, the cellular network 313 and network elements located in one or more of the buildings 312 representing an enterprise or residence. The ISP network 305 utilizes technology for transporting Internet traffic.

In an enterprise setting, the building 312 can include a gateway 314 that provides voice and/or video connectivity services between communication devices 316, such as VoIP terminals or other forms of communication devices of enterprise personnel. In a residential setting, the building 312 can include a gateway 314 represented by, for example, a residential gateway coupled to central office 306 utilizing conventional telephonic switching for processing calls with third parties.

The network proxy 322 can be used to control operations of a media gateway 309, the central office 306 and the gateway 314. Communications between the network proxy 322, the communication devices 316 and other network elements of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an EP interface with the network 305, the media gateway 309, the cellular network 313, and/or the gateway 314. By way of the communications interface 324, the network proxy 322 can direct by common means any of the foregoing network elements to establish packet switched data, voice, and/or video connections between communication devices 316 distributed throughout the communication system 300. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for communication devices 316, including VoIP terminals.

The central office 306 can house common network switching equipment for distributing local and long-distance telecommunication services supplied by network 305 to buildings 312 (such as dwellings or commercial enterprises). Telecommunication services of the central office 306 can include traditional POTS (Plain Old Telephone Service) and broadband services such as HDTV, DSL, VoIP, IPTV (Internet Protocol Television), Internet services, and so on. The communication system 300 can utilize common computing and communications technologies to support circuit-switched and/or packet-switched communications.

The cellular network 313 can support voice and data services over a number of access technologies such as GSM-GPRS, EDGE, CDMA-1X, UMTS, WiMAX, software defined radio (SDR), and other known and future technologies. The cellular network 313 can be coupled to base stations 327 under a frequency-reuse plan for communicating over-the-air with roaming VoIP terminals 316.

Figure 4:
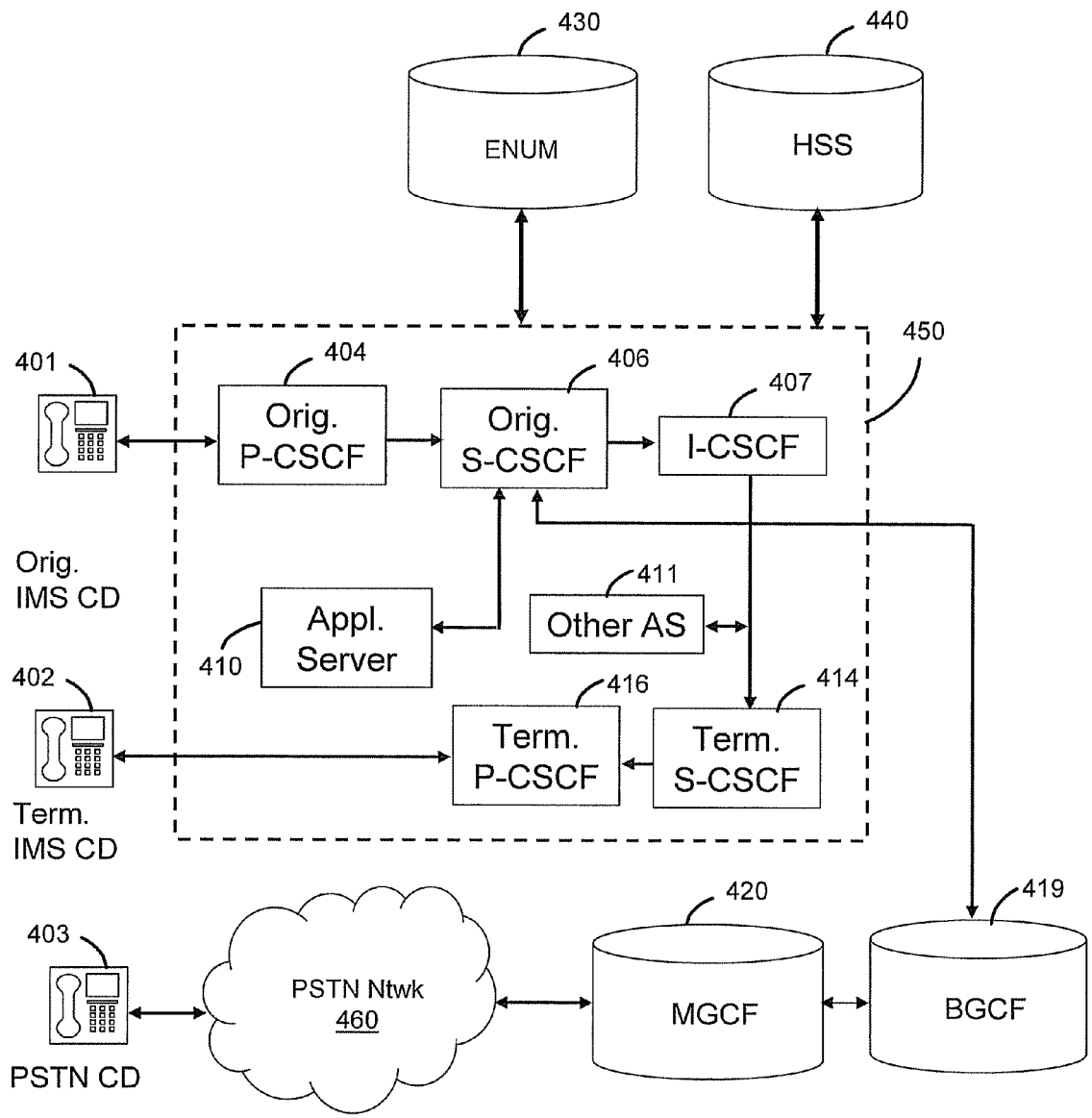

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an EMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
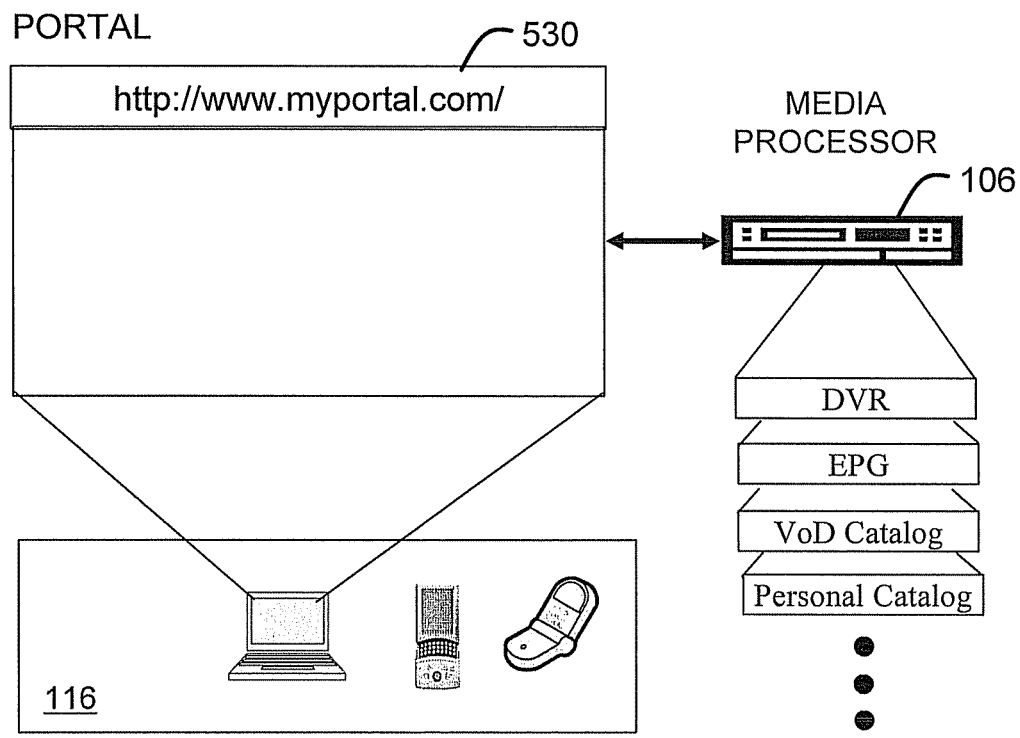
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (ULRL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
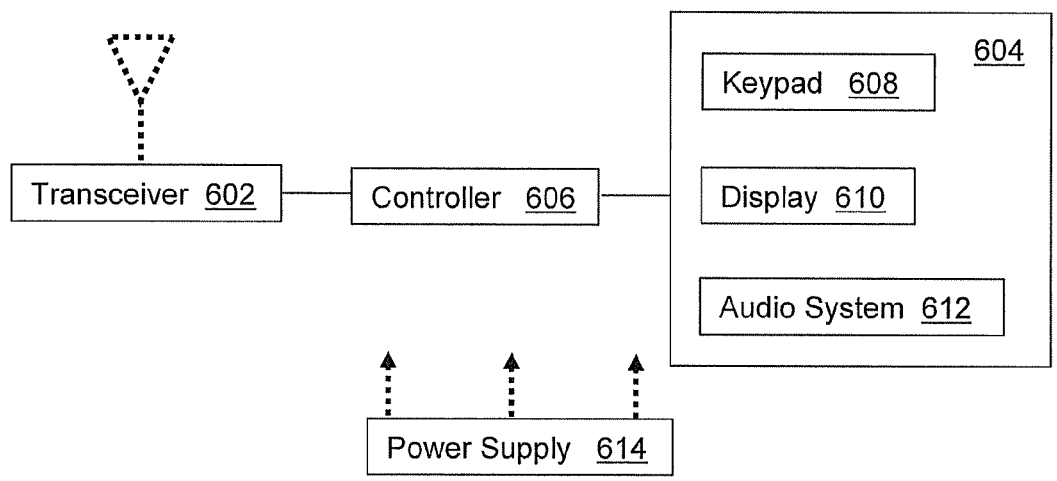
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UD) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, and/or navigation disk for manipulating operations of the communication device 600. The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
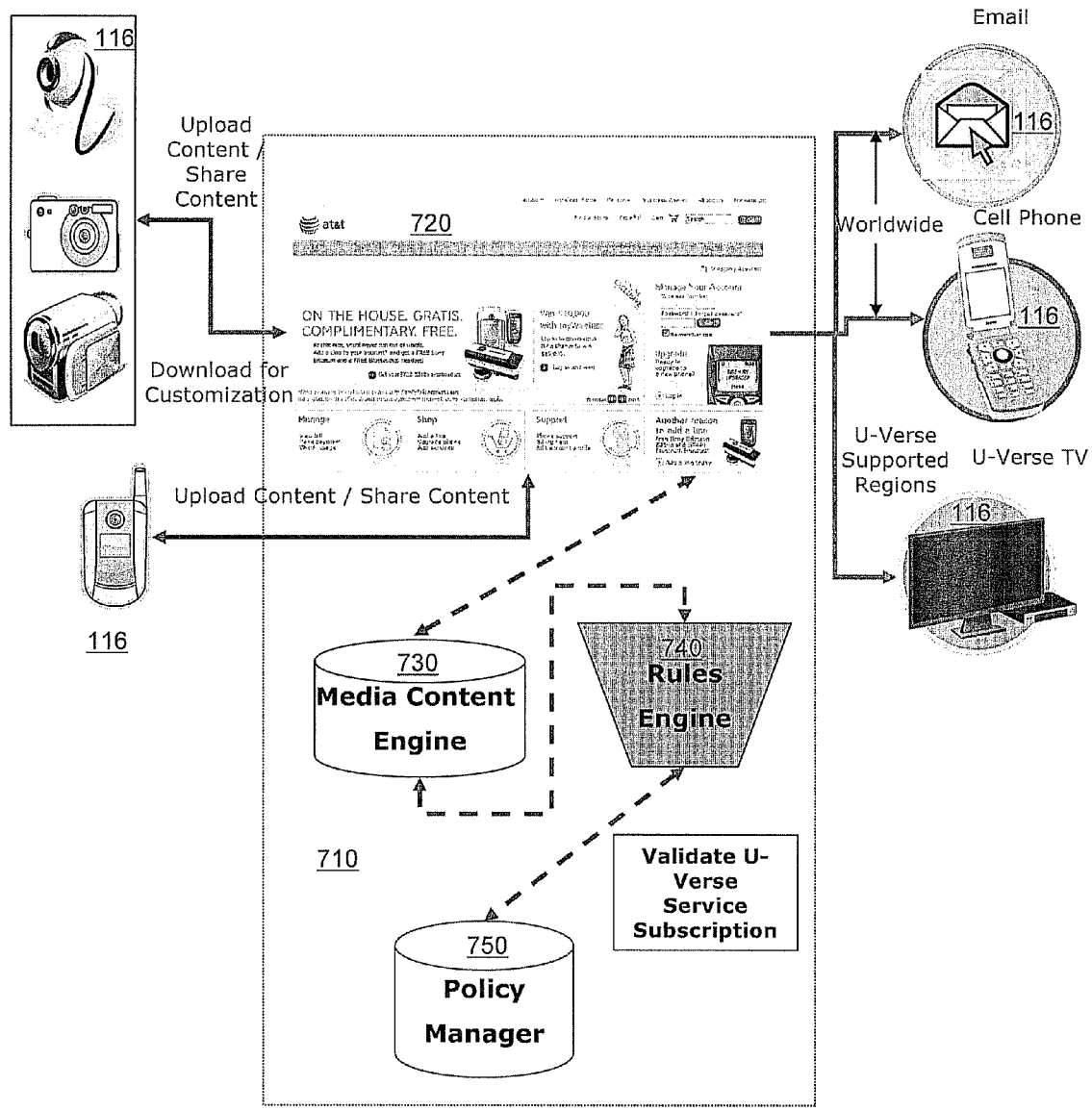
FIGS. 7-8 depict illustrative embodiments of communication systems that provide media services.

FIG. 7 depicts an exemplary embodiment of a communication system 700 for delivering media content. The communication system 700 can represent an IMS broadcast media system. Communication system 700 can be overlaid or operably coupled with communication systems 100-400 as another representative embodiment of said communication systems.

System 700 can include a plurality of communication devices 116 where at least one the devices (i.e., the distributor) can capture media content, such as video or still images of a concert. The communication devices 116 can be in communication with a network portal 720 of a network management system (NMS) 710. The NMS 710 or portions thereof can be in communication with the communication devices 116 by way of wired and/or wireless links. The NMS 710 can include a media content engine 730 and a policy manager 750, which can be in communication with various other devices and systems of the NMS, such as a rule management engine 740. It should be understood by one of ordinary skill in the art that these features can be separate components of the NMS 710 or one or more of these components can be incorporated together. As will be discussed again later, the NMS 710 can include a media server or the like for performing a number of functions, including reformatting of the media content.

In one embodiment, system 700 allows a distributor to log into the system through use of portal 720; personalize the media content to be distributed; direct upload of the media content from his or her communication device, such as a cell phone; browse the media content; identify the media content; provide pricing information regarding distribution; select distribution information in combination with or in replacement of distribution information from a user profile associated with the distributor. The targeted recipients can be various types of communication devices, including cell phones, IPTV set top boxes, and so forth. Media content engine 730 can be utilized for reformatting of the media content as it is received from the distributor communication device. Policy manager 750 can be utilized for authentication of the distributor communication device.

In one embodiment, one or more of the media content engine 730, the rules engine 740 and the policy manager 750 can apply distribution policies and the like to the distribution of the media content. For instance, the user profile can indicate that the distributor is a child and can implement parental control policies to limit types of distribution, such as recipients, media content genre, large media content and so forth. In another embodiment, the NMS 710 can monitor the media content and determine media content characteristics in order to implement the policies. The policies can vary and can include privacy policies, parental control policies, and so forth.

Figure 8:
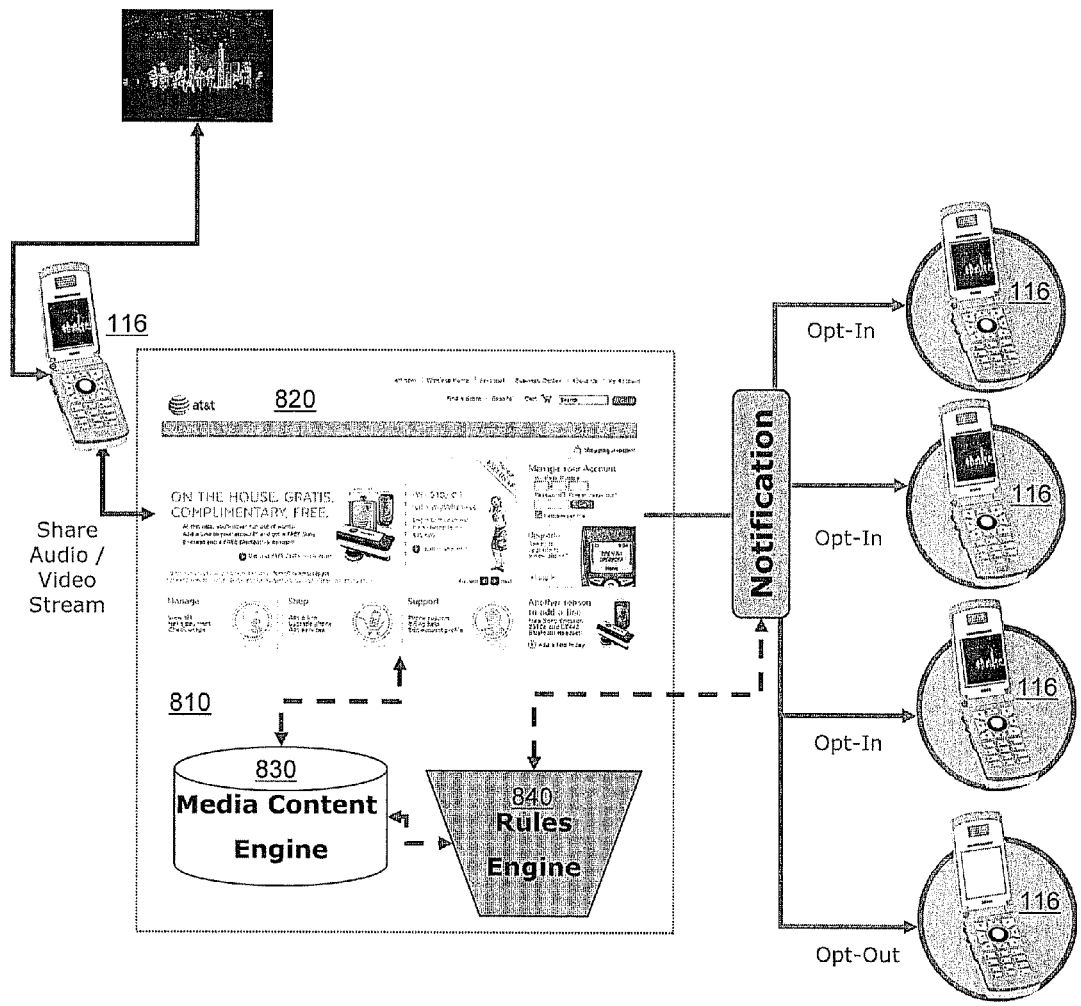

FIG. 8 depicts an exemplary embodiment of a communication system 800 for delivering media content. The communication system 800 can represent an IMS broadcast media system. Communication system 800 can be overlaid or operably coupled with communication systems 100-400 and 700 as another representative embodiment of said communication systems.

System 800 can include a plurality of communication devices 116 where at least one the devices (i.e., the distributor) can capture media content, such as video or still images of a concert. The communication devices 116 can be in communication with a network portal 820 of a network management system (NMS) 810. The NMS 810 or portions thereof can be in communication with the communication devices 116 by way of wired and/or wireless links. The NMS 810 can include a media content engine 830, which can be in communication with various other devices and systems of the NMS, such as a rule management engine 840. It should be understood by one of ordinary skill in the art that these features can be separate components of the NMS 810 or one or more of these components can be incorporated together. As will be discussed again later, the NMS 810 can include a media server or the like for performing a number of functions, including reformatting of the media content.

In one embodiment, system 800 allows a distributor to elect to share audio/video broadcast with targeted recipients via his or her communication device 116, such as a cell phone; authenticate the distribution request; select the targeted recipients in combination with or in place of a user profile. System 800 can transmit opt-in or opt-out messages to the targeted recipients so that each of the targeted recipients can accept or decline an incoming stream.

Figure 9:
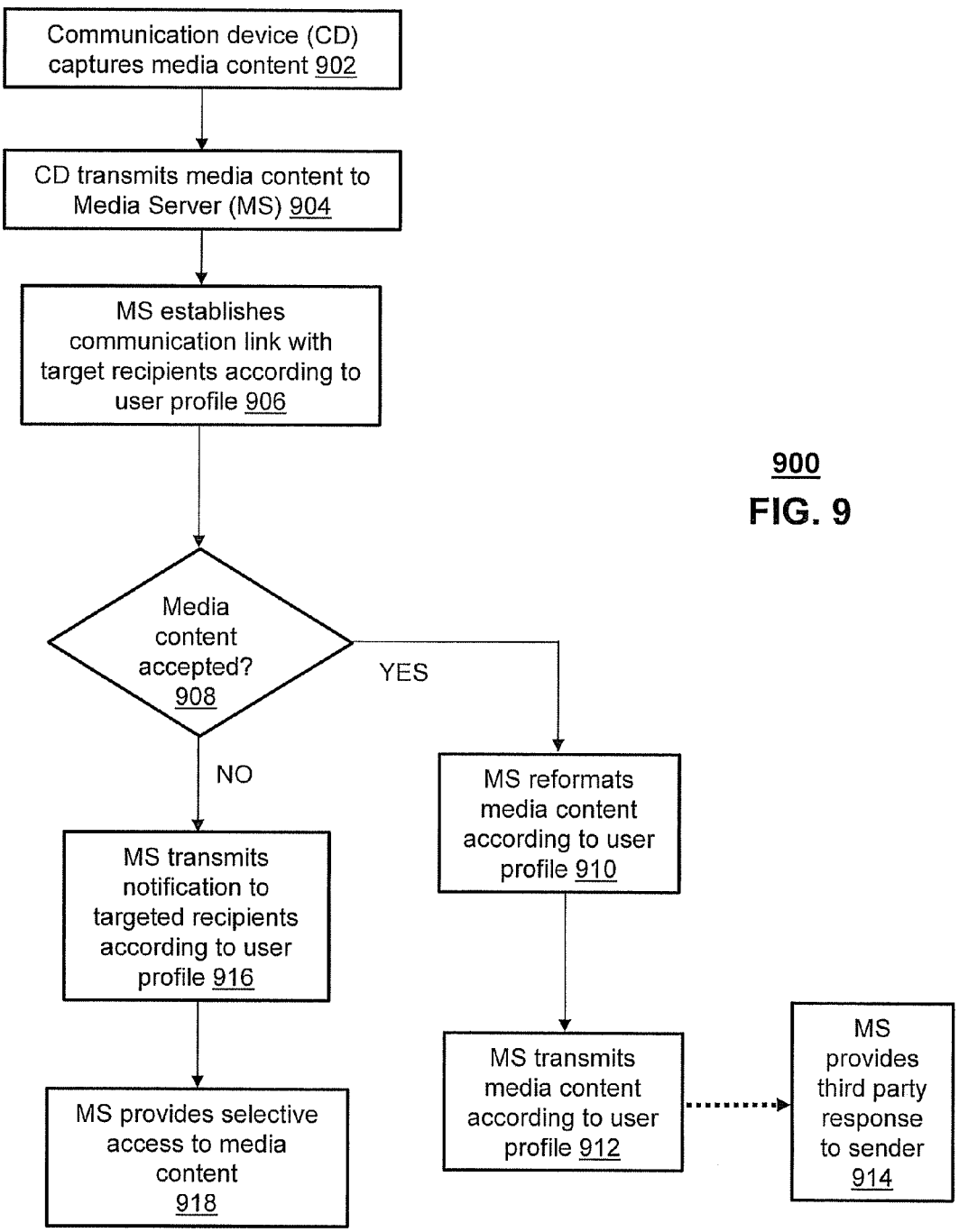
FIG. 9 depicts an illustrative embodiment of a method operating in portions of the communication systems of FIGS. 1-4 and 7-8.

FIG. 9 depicts an exemplary method 900 operating in portions of one or more of the communication systems 100-400 and 700-800. Method 900 has variants as depicted by the dashed lines. It would be apparent to an artisan with ordinary skill in the art that other embodiments not depicted in FIG. 9 are possible without departing from the scope of the claims described below. The method is described with respect to components of system 800, including the NMS 810, however, other components of the other systems can also be utilized.

Method 900 can begin with step 902 where the communication device 116 can capture media content that is to be stored and/or distributed to the communication devices of one or more targeted recipients. For example, the communication device 116 can be a mobile phone with a video recorder for capturing moving images. Other media types are also contemplated by the present disclosure, such as still images, music, and video games, among others. The present disclosure also contemplates the communication device obtaining the multimedia content by other techniques, such as the content being forwarded from another communication device. The communication device 116 can obtain the media content from another device or network, such as by accessing a remote database. For example, the communication device 116 can browse media content from a remote database and instruct that the media content be forwarded to the portal 820 of the NMS 810 mailbox without storing the content in the communication device.

In step 904, the communication device 116 can transmit the media content to the NMS 810, such as through accessing portal 810 of a media server of the NMS. In one embodiment, the transmission of the media content for distribution can be incorporated into the step of capturing the media content, such as a function key on the communication device 116 that provides for both capturing video and distributing the video. In step 906, the media server can establish a communication link with one or more targeted recipients based on a user profile. For example, the user profile associated with the sender communication device can list all target recipients that are to potentially receive the media content. The user profile can provide various information for establishing the communication link with the targeted recipient, such as communication device identification information, preferred method of delivery, delivery times, and so forth. In one embodiment, the user profile can also specify one or more properties associated with the media content, e.g., title, description, and so forth, that can be utilized during the establishment of the communication link, such as text messaging the title to the targeted recipient along with the request to receive the media content.

In step 908, the media server can determine if one or more of the targeted recipients have accepted distribution of the media content. If distribution is accepted then in step 910 the media server can determine the appropriate format of the media content for delivery to the particular targeted recipient. For example, the media server can reformat the media content according to preferences or a desired format stored in the user profile that are associated with the communication devices of the targeted recipients (e.g., a recipient format). For instance, a user profile can designate a file format to be used for particular communication devices of the targeted recipients that may only have software that is capable of reading that particular file format. As another example, a user profile can designate targeted recipients that are to receive images of a particular resolution in order to reduce the size of the media content file. The degree of reformatting of the media content by the media server can vary and can include transcoding and/or translating. In one embodiment, the reformatting can include adjusting a color contrast or other property of an image (e.g., a resolution), but other reformatting is also contemplated including re-encoding the file for use by a particular communication device.

The user profile can be a single profile associated with the communication device 116 that is capturing the media content and/or can be a number of user profiles, including a group profile. In one embodiment, the user profile associated with the sender communication device can designate the targeted recipients and the media server can consult the user profiles associated with the targeted recipients for delivery information, including preferred format of delivery and so forth. In other embodiment, a group profile can be created so that the media server consults the single group profile for all of the delivery information. In yet another embodiment, the user profile can be utilized in combination with inputs from the sender of the media content to establish the delivery information, such as providing a list of targeted recipients and the option to exclude members of the list from receiving the media content.

In step 912, the media server can transmit the media content to each of the targeted communication devices that have accepted delivery. In one embodiment, the transmission of the media content can be regulated or otherwise implemented according to the user profile. For instance, the user profile can designate a quality of media content to be received by the targeted communication device. Based on the designated quality and in combination with feedback from the targeted communication device, the media server can the format of the media content that is being delivered, such as providing a lower resolution video with higher error correction. In this embodiment, the formatting of the media content can be adjusted after delivery of the media content has begun.

In one embodiment as in step 914, the media server can provide for third party communication with the sender of the media content. For example, the media server can provide a targeted recipient with response options that are associated with the media content that was delivered. In one embodiment, the media server can monitor the type of media content or other characteristics of the media content so that the response options can be provided to the targeted recipient. For instance, the media server can determine that a concert which was captured by the sender is of a particular genre of music and can provide response options based on that genre of music, such as a listing of available concert tickets in that genre, links to the bios of singers in that genre, and so forth.

If on the other hand in step 908, the targeted recipient does not accept delivery of the media content then in step 916 the media server can provide notification of the availability of the media content and in step 918 can provide selective access to the media content. The notification can be based on the user profile. For example, the notification can be a reminder sent at various intervals during the capture of the media content which allows the targeted recipient to receive the media content in progress. The type of notification can also be based on the user profile, such as sending messages on a number of different communication devices associated with the targeted recipient and/or utilizing presence information to determine which communication devices should receive the notification. In one embodiment, the selective access can be provided only during the capture of the media content. For example, the sender communication device 116 can capture the media content and provide it to the media server for immediate reformatting and distribution, e.g., real time. In one embodiment, the media server can reformat and distribute the media content without taking up storage space that would be needed for later pulling of the media content by the targeted recipient. In another embodiment, the media content can be provided to the targeted recipients via pull distribution where the media content is stored by the media server for later access by the targeted recipients. In one embodiment, the user profile can determine the selective access to be provided to the targeted recipients, such as allowing later pull distribution by some of the targeted recipients but only allowing in progress push distribution to other targeted recipients.

Upon reviewing the aforementioned embodiments, it would be evident to an artisan with ordinary skill in the art that said embodiments can be modified, reduced, or enhanced without departing from the scope and spirit of the claims described below. For example, other information can be provided by the distributor of the media content, such as the title or summary of the content or its urgency. The targeted recipients and the types of distribution can be varied. For example, the user profile can have a number of entries for various targeted recipients and various types of distribution associated with those targeted recipients. The user can select a particular entry through use of his or her communication device, such as at the time of requesting distribution. The entries can also be modified at anytime to provide further flexibility and efficiency to the distribution of the multimedia content to the group of targeted recipients. The media server can also vary the type of distribution, such as providing hyperlinks to the multimedia content on the targeted recipient's web page and/or on the user's web page. As another example, the media server can provide various modes of later distribution, such as only upon request or as a batch delivery to groups of the targeted recipients.

Other suitable modifications can be applied to the present disclosure without departing from the scope of the claims below. Accordingly, the reader is directed to the claims section for a fuller understanding of the breadth and scope of the present disclosure.

Figure 10:
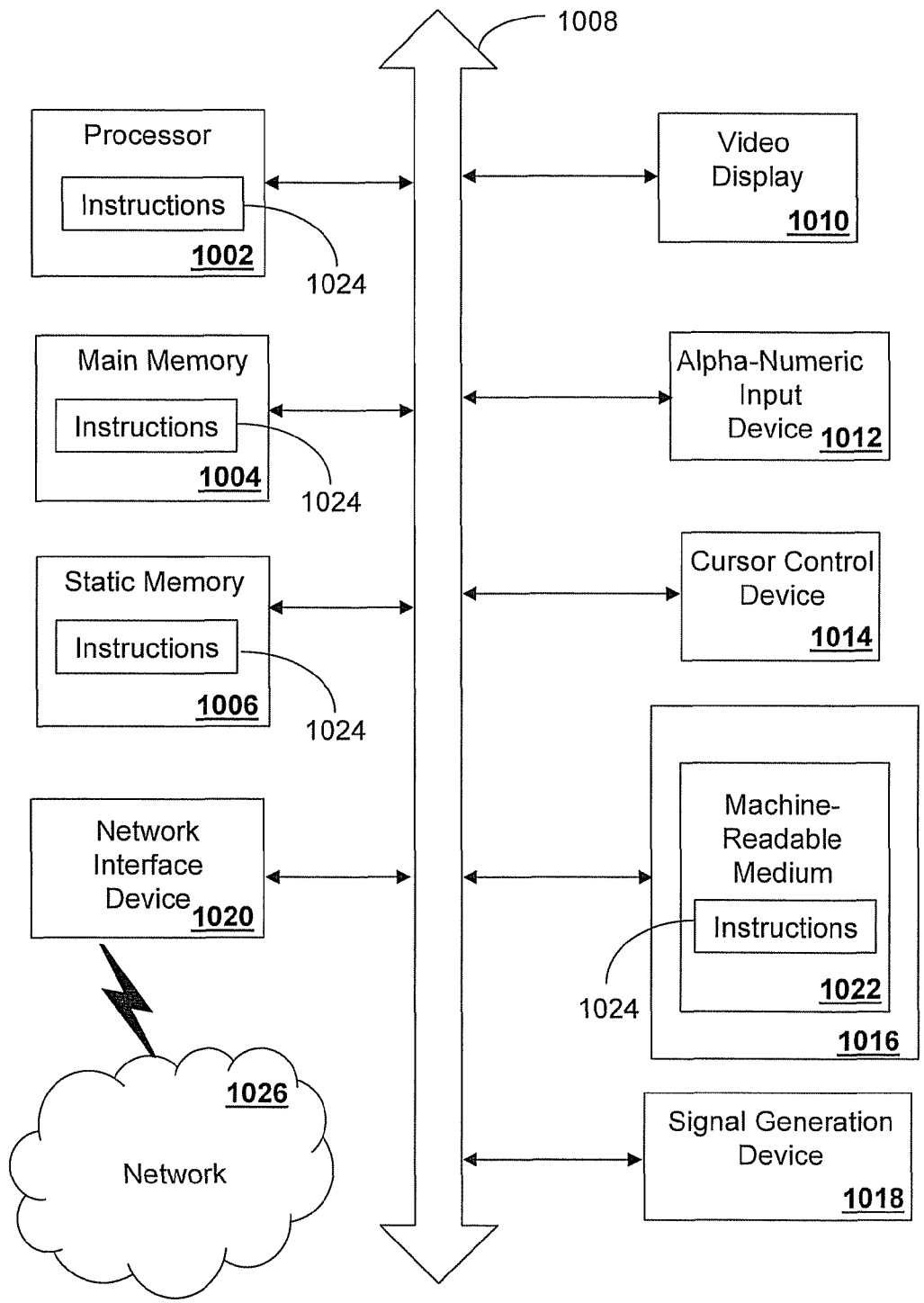
FIG. 10 is a diagrammatic representation of a machine in the form of a computer system within which a set of instructions, when executed, may cause the machine to perform any one or more of the methodologies discussed herein.

FIG. 10 depicts an illustrative diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a computer-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which when executed by a processor cause the processor to perform operations comprising:
   receiving media content from a first communication device, wherein the media content is recorded and transmitted by the first communication device responsive to selection of a first function of the first communication device;
   receiving a request to distribute the media content from the first communication device;
   facilitating establishment of a communication link with a plurality of targeted devices associated with a plurality of targeted recipients of the media content according to a user profile associated with the first communication device, wherein the user profile specifies the plurality of targeted devices;
   transmitting a first text message to the plurality of targeted devices to offer delivery of the media content to the plurality of targeted devices, wherein the text message comprises a title of the media content;
   determining whether a first targeted recipient of a first targeted device of the plurality of targeted devices has accepted delivery of the media content;
   responsive to determining that the first targeted recipient has not accepted delivery, transmitting a notification to a second communication device that is associated with the first targeted recipient; and
   responsive to determining that the first targeted recipient has accepted delivery, providing the media content to the first targeted device.

2. The non-transitory computer-readable storage medium of claim 1, wherein the user profile associated with the first device further comprises a delivery format associated with the first targeted device, and further comprising computer instructions to cause the processor to perform operations comprising:
   adjusting a format of the media content that is provided to the targeted device according to the delivery format.

3. The non-transitory computer-readable storage medium of claim 2, comprising computer instructions to cause the processor to perform operations comprising updating the delivery format based upon an input into the first communication device.

4. The non-transitory computer-readable storage medium of claim 1, comprising computer instructions to cause the processor to perform operations comprising:
   storing the media content.

5. The non-transitory computer-readable storage medium of claim 1, comprising computer instructions to cause the processor to perform operations comprising:
   storing the user profile associated with the first communication device; and
   transmitting opt-in or opt-out messages to the plurality of targeted devices so that each of the plurality of targeted recipients can accept or decline the media content.

6. The non-transitory computer-readable storage medium of claim 1, comprising computer instructions to cause the processor to perform operations comprising determining the first targeted device based upon an input into the first communication device.

7. The non-transitory computer-readable storage medium of claim 1, wherein the user profile is a group profile associated with the first communication device and the plurality of targeted devices.

8. A server, comprising:

a memory to store computer instructions; and a processor coupled to the memory, wherein the processor, responsive to executing the computer instructions, cause the processor to perform operations comprising:

receiving media content from a first communication device, wherein the media content is recorded and transmitted by the first communication device responsive to selection of a first function of the first communication device;

receiving a request to distribute the media content from the first communication device;

facilitating establishment of a communication link with a plurality of targeted devices associated with a plurality of targeted recipients of the media content according to a user profile associated with the first communication device, wherein the user profile specifies the plurality of targeted devices;

transmitting a first text message to the plurality of targeted devices to offer delivery of the media content to the plurality of targeted devices, wherein the text message comprises a title of the media content;

determining whether a first targeted recipient of a first targeted device of the plurality of targeted devices has accepted delivery of the media content;

responsive to determining that the first targeted recipient has not accepted delivery, transmitting a notification to a second communication device that is associated with the first targeted recipient; and responsive to determining that the first targeted recipient has accepted delivery, providing the media content to the first targeted device.

9. The server of claim 8, wherein the computer instructions cause the processor to perform operations comprising:

transmitting opt-in or opt-out messages to the targeted device.

10. The server of claim 9, wherein the computer instructions cause the processor to perform operations comprising storing the user profile.

11. The server of claim 9, wherein the computer instructions cause the processor to perform operations comprising:

storing the media content; and providing access to the media content according to the user profile.

12. The server of claim 8, wherein the computer instructions cause the processor to perform operations comprising:

determining a desired format for the media content based on a user profile associated with the first communication device; and adjusting a format of the media content based on the desired format.

13. The server of claim 12, wherein the computer instructions cause the processor to perform operations comprising overriding the determination of the desired format based upon an input into the first communication device.

14. A method comprising:

receiving, by a system comprising a processor, media content from a first communication device, wherein the media content is recorded and transmitted by the first communication device responsive to selection of a first function of the first communication device;

receiving, by the system, a request to distribute the media content from the first communication device;

facilitating, by the system, establishment of a communication link with a plurality of targeted devices associated with a plurality of targeted recipients of the media content according to a user profile associated with the first communication device, wherein the user profile specifies the plurality of targeted devices;

transmitting, by the system, a first text message to the plurality of targeted devices to offer delivery of the media content to the plurality of targeted devices, wherein the text message comprises a title of the media content;

determining, by the system, whether a first targeted recipient of a first targeted device of the plurality of targeted devices has accepted delivery of the media content;

responsive, by the system, to determining that the first targeted recipient has not accepted delivery, transmitting a notification to a second communication device that is associated with the first targeted recipient; and responsive, by the system, to determining that the first targeted recipient has accepted delivery, providing the media content to the first targeted device.

15. The method of claim 14, comprising capturing, by the system, the media content at a first communication device.

16. The method of claim 15, wherein the user profile is a group profile associated with the first communication device.

17. The method of claim 14, comprising transmitting, by the system, opt-in or opt-out messages to the targeted device of the targeted recipient.

* * * * *